United States Patent [19]

Urai

[11] Patent Number: 4,478,383
[45] Date of Patent: Oct. 23, 1984

[54] SEAT FRAME WITH AN INTEGRALLY BUILT-IN SLIDE RAIL MECHANISM

[75] Inventor: Muneharu Urai, Tokyo, Japan

[73] Assignee: Tachikawa Spring Co., Ltd., Tokyo, Japan

[21] Appl. No.: 280,911

[22] Filed: Jul. 6, 1981

[51] Int. Cl.³ .......................................... F16M 13/00
[52] U.S. Cl. ................................... 248/429; 248/430
[58] Field of Search ................ 248/429, 430; 297/346

[56] References Cited

U.S. PATENT DOCUMENTS

| 1,887,077 | 11/1932 | Westrope | 248/429 |
| 2,139,174 | 12/1938 | Saunders | 248/430 |
| 2,271,913 | 2/1942 | Crabb | 248/430 |
| 2,579,597 | 12/1951 | Moroney | 248/430 |
| 3,013,763 | 12/1961 | Weberman | 248/429 |
| 3,501,121 | 3/1970 | Lautenbach | 248/430 |
| 3,930,632 | 1/1976 | Shigeta et al. | 248/429 |

FOREIGN PATENT DOCUMENTS

| 2713973 | 3/1977 | Fed. Rep. of Germany | 248/429 |
| 2419839 | 11/1979 | France | 248/430 |

Primary Examiner—Francis K. Zugel
Attorney, Agent, or Firm—Oldham, Oldham, Hudak & Weber Co.

[57] ABSTRACT

A seat frame with an integrally built-in slide rail mechanism, in which a seat-frame side member and a member corresponding to the upper member of the slide rail are integrally combined into a frame structure defining an internal space of closed section, and principal parts of the slide rail mechanism, including a stopper actuated by a handle through a lever, are disposed in this internal space. A slide-rail lower member disposed beneath the corresponding member is formed with locking slots with which engaging lugs of the stopper are engageable so that the seat frame can be locked in any desired position and unlocked to make longitudinal movement along the slide rails.

2 Claims, 11 Drawing Figures

SEAT FRAME WITH AN INTEGRALLY BUILT-IN SLIDE RAIL MECHANISM

BACKGROUND OF THE INVENTION

This invention relates to a seat frame with an integrally built-in slide rail mechanism, which is suitable for use in seats of vehicles and furnitures by virtue of its light weight and improved mechanical strength.

Conventional seat frames used in seats of vehicles are composed of members of open section. Such a seat frame has been unsatisfactory from the aspect of safety due to its low mechanical strength. Further, the slide rail mechanism guiding the longitudinal sliding movement of the combination of the seat frame and the vehicle's seat relative to the floor has been separately prepared and coupled to the seat frame by means such as bolts and nuts. Accordingly, the seat frame and the slide rail mechanism have included overlapping parts resulting in a heavy weight, a large number of steps required for the manufacture and assembling, and a high cost.

Also, because of the fact that the slide rail mechanism is fabricated separately from the seat frame, the arrangement of the individual parts is inevitably subject to limitations from the aspect of available installation space.

Moreover, because of the fact that the front and side members of the seat frame are merely welded together at their end portions only, the prior art seat frame has been unsatisfactory from the aspect of mechanical strength.

STATEMENT OF OBJECT

With a view to obviate these defects of the prior art seat frame, it is a primary object of the present invention to provide a novel and improved seat frame with an integrally built-in slide rail mechanism, in which a side member of the seat frame and a member corresponding to the upper member of the slide rail are integrally assembled into a frame structure defining an internal space of closed section, and the principal parts of the slide rail mechanism are disposed in this internal space thereby integrating the slide rail mechanism and the seat frame into a compact assembly so as to simplify the construction, and reduce the total weight, while, at the same time, improving the mechanical strength and reducing the manufacturing cost.

In accordance with the present invention, therefore, there is provided a seat frame with an integrally built-in slide rail mechanism comprising a seat frame structure formed by integrally combining a seat-frame side member and a member corresponding to a slide-rail upper member to define an internal space of closed section therein, a stopper disposed in the internal space to extend through an elongate slot bored in an upper portion of the seat-frame side member and an aligned elongate slot bored in the corresponding member, the stopper being formed with cutout or socket means in a substantially middle portion thereof and being also formed with engaging means in its bottom portion, actuating means including means extending into the cutout or socket means of the stopper for causing vertical movement of the stopper, and a slide-rail lower member disposed beneath the corresponding member to permit sliding movement of the corresponding member relative thereto by the aid of rolling members or sliders, the slide-rail lower member being formed in its bottom portion with locking means engageable with the engaging means of the stopper, whereby the stopper is moved vertically by the actuating means to bring and release the engaging means of the stopper into and from engagement with the locking means of the slide-rail lower member to releasably lock the seat frame in any desired position and to permit longitudinal displacement of the seat frame when so desired.

BRIEF DESCRIPTION OF DRAWINGS

Preferred embodiments of the present invention will now be described in detail with reference to the accompanying drawings, in which.

DETAILED DESCRIPTION

Figure 1:
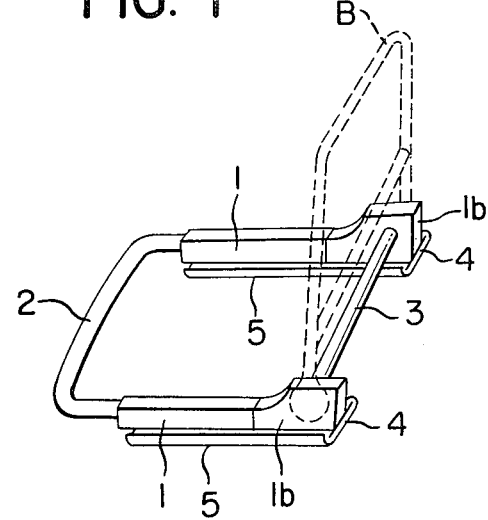
FIG. 1 is a schematic perspective view showing the relative positions of the members of the seat frame with an integrally built-in slide rail mechanism according to the present invention.

Referring now to FIG. 1 which is a schematic perspective view showing the relative positions of the members of the seat frame with an integrally built-in slide rail mechanism according to the present invention to be described in detail with reference to FIG. 2 and succeeding figures, a pair of spaced parallel side members 1 have an open bottom, and a member 4 corresponding to an upper member of a slide rail is integrally fixed at a portion thereof to the open bottom wall of each of the side members 1 to form an internal space of closed section. A bracket 1b is shown welded to the rear end of each of the side members 1 in FIG. 1. The bottom wall of each of the brackets 1b is also closed by the associated portion of the corresponding member 4 to also form an internal space of closed section, continuous to the former space.

A front member 2 and a rear member 3 constitute a cushion frame together with the side members 1, and the cushion frame constitutes a seat frame together with a back frame B shown in FIG. 1. Lower members 5 of the slide rails are fixed to the floor of a vehicle compartment through seat risers (not shown), and rolling members such as balls or rollers are interposed between the slide-rail lower members 5 and the corresponding members 4 forming the lower part of the seat frame so that the entire seat frame permitted to slide over a distance of about 150 mm to be adjustably set or locked at any desired position within the above range.

Figure 2:
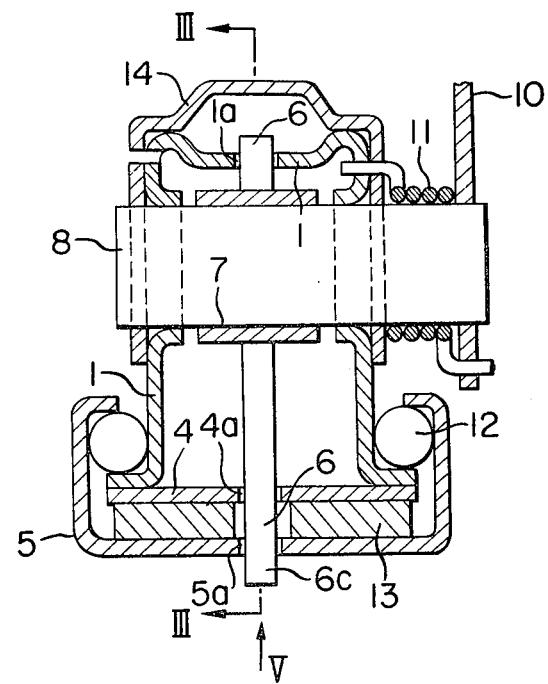
FIG. 2 is a vertical sectional view showing the structure of a first embodiment of the present invention.

A first embodiment of the present invention is shown in FIGS. 2 to 6. Referring to FIG. 2, the corresponding member 4 is welded to the open bottom wall of the associated side member 1 to form an internal space of closed section therebetween. A reinforcing member 14 is welded to the outer surface of the side member 1 to increase the mechanical strength.

Figure 3:
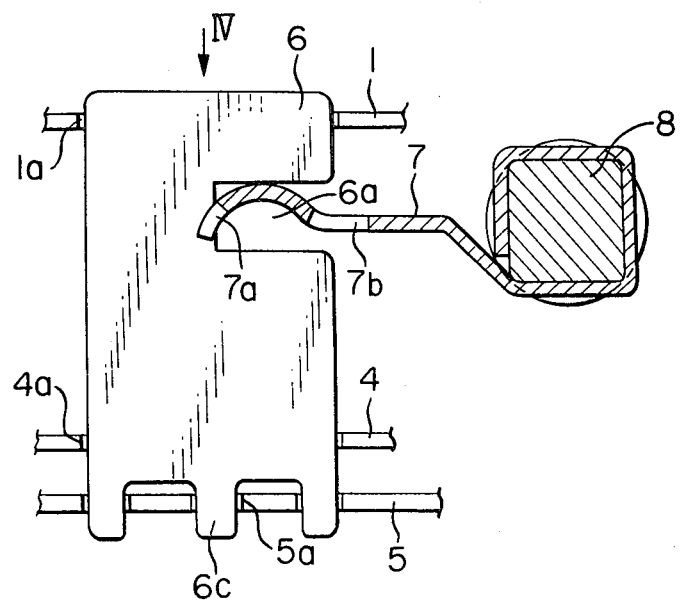
FIG. 3 is a sectional view taken along the line III—III in FIG. 2.
Figure 5:
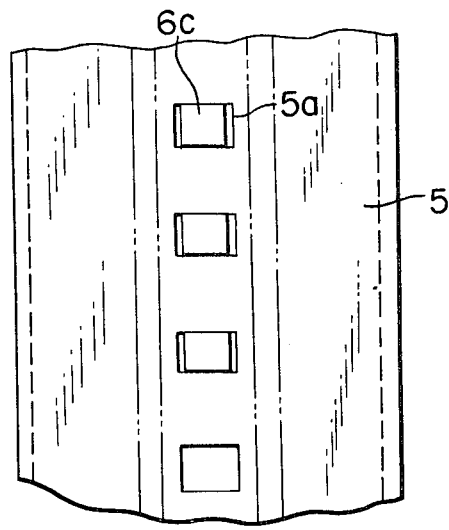
FIG. 5 is a plan view when viewed in the direction of the arrow V in FIG. 2.
Figure 6:
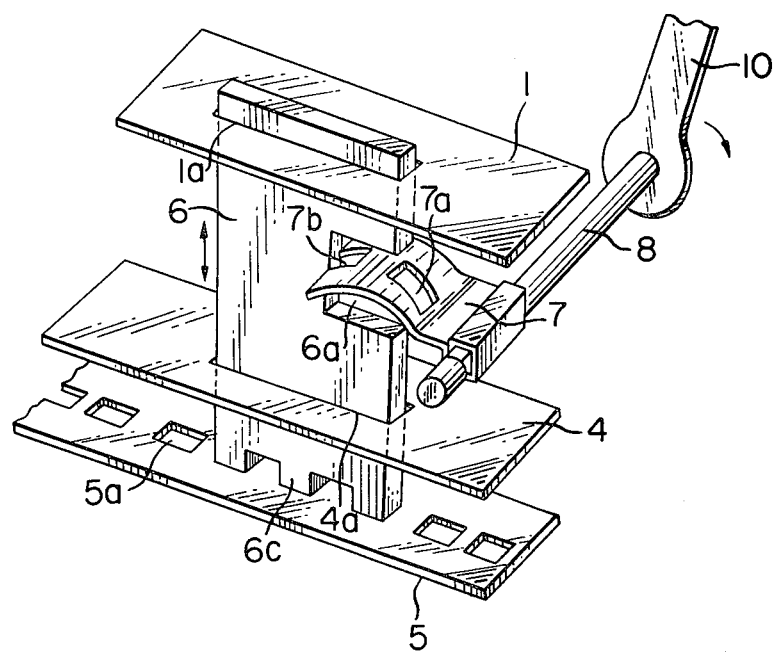
FIG. 6 is a perspective view showing how the stopper is moved in the vertical direction.

Rollers 13 are interposed between the corresponding member 4 and the horizontal portion of the slide-rail lower member 5 fixed to the floor of the vehicle compartment, and balls 12 are interposed between the lower portion of the side member 1 and the upstanding portion of the slide-rail lower member 5. An elongate slot 1a is provided in the top portion of the side member 1, and an aligned elongate slot 4a is provided in the associated portion of the corresponding member 6. A stopper 6 extends through these slots 1a and 4a. As best shown in FIGS. 3 and 6, this stopper 6 is in the form of a generally rectangular flat plate which is formed in its upper portion on one side thereof with a horizontal cutout or socket 6a and in its bottom portion with a plurality of equally spaced teeth or engaging lugs 6c. As shown in FIG. 5, the slide-rail lower member 5 is formed in its horizontal portion with a plurality of equally spaced locking slots 5a aligned on a line so as to be releasably engaged by the engaging lugs 6c of the stopper 6 thereby locking the seat frame in position.

Aligned holes are bored in the side walls of the reinforcing member 14 and side member 1 by means such as a press or a burring machine to receive therein a shaft 8 described below.

Figure 4:
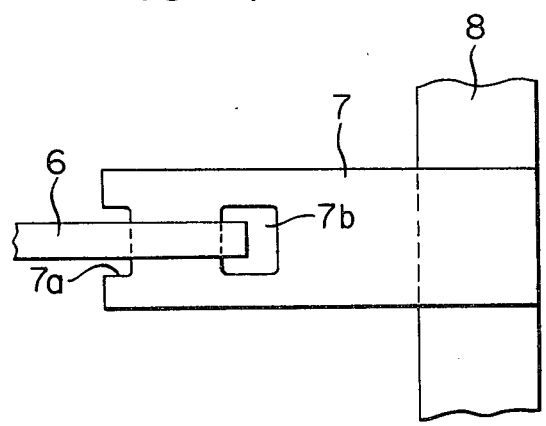
FIG. 4 is a plan view when viewed in the direction of the arrow IV in FIG. 3.

As shown in FIGS. 3, 4 and 6, an actuating lever 7 for causing vertical movement of the stopper 6 toward and away from the slide-rail lower member 5 is formed in its inner end portion with a cutout 7a for avoiding abutment of that end portion with the stopper 6 and in a portion near the inner end portion with a slot 7b for avoiding abutment of that portion with the stopper 6 during the vertical movement of the stopper 6. The shaft 8 includes a square-shaped portion adjacent to one of its ends, and the outer end portion of the lever 7 is securely crimped to the squared-shaped portion of the shaft 8 as best shown in FIGS. 3 and 6. A handle 10 is fixedly mounted on the other end of the shaft 8, with a return spring 11 being compressed on the shaft 8 between the handle 10 and the reinforcing member 14 as best shown in FIG. 2.

FIG. 2 shows that the stopper 6 is urged downward, and its engaging lugs 6c engage with the mating slots 5a of the slide-rail lower member 5 to lock the seat frame in position. When the handle 10 is turned in the direction of the arrow shown in FIG. 6, the inner end of the actuating lever 7 is moved upward thereby urging the stopper 6 upward. Consequently, the engaging lugs 6c of the stopper 6 are disengaged from the mating slot 5a of the slide-rail lower member 5 thereby releasing the seat frame from the locked position. The seat can be now moved to any desired position by being guided by the slide rails, and, when the force gripping handle 10 is released, the stopper 6 is urged downward by the force of the return spring 11 (FIG. 2), so that the engaging lugs 6c of the stopper 6 engage now with the mating slots 5a of the slide-rail lower member 5 again thereby locking the seat frame in the desired position.

Figure 7:
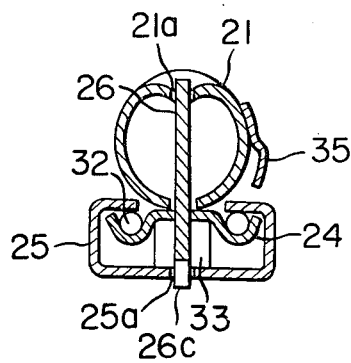
FIG. 7 is a vertical sectional view of part of a second embodiment of the present invention.

FIG. 7 shows part of the second embodiment of the present invention. Referring to FIG. 7, a tubular side member 21 is formed with a cutout in its bottom portion, and a member 24 corresponding to an upper member of a slide rail is welded integrally to the side member 21 in such a relation as to close the cutout of the side member 21 thereby forming an internal space of closed section. A portion for inserting the end of a cover assembly inserting portion 35 is then welded to the side surface of the side member 21. The mechanism for causing vertical movement of a stopper 26 is similar to that shown in FIG. 6. More precisely, the stopper 26 is received in its upper end portion in an elongate slot 21a of the side member 21 to be guided by the slot 21a and is engaged in its lower end portion formed with a plurality of engaging lugs 26c by mating slots 25a of a slide-rail lower member 25. Reference numerals 32 and 33 designate balls and rollers respectively.

In this second embodiment, the side member 21, the inserting portion 35 and the corresponding member 24 are welded together into an integral assembly. However, in a modification, the side member 21 and the corresponding member 24 may be integrally formed by a rolling machine, and the cover assembly inserting portion 35 may be provided by boring a hole in the side member 21. In another modification, all of these three members may be initially formed into an integral assembly by extrusion from an extruding machine.

Figure 8:
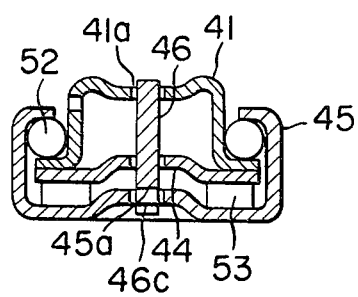
FIG. 8 is a vertical sectional view of part of a third embodiment of the present invention.

FIG. 8 shows a third embodiment of the present invention in which the seat frame has a lowered height. The slide rail mechanism is similar to that shown in FIG. 6. A side member 41 is in the form of a barrel of low height having an open bottom wall. The open bottom wall of the side member 41 is closed by a member 44' corresponding to the slide-rail upper-member to form an internal space of closed section. A stopper 46 is received in its upper end portion in an elongate slot 41a of the side member 41 to be guided by the slot 41a, and a plurality of engaging lugs 46c formed in the lower end portion of the stopper 46 are engaged by mating slot 45a of a slide-rail lower member 45. Reference numerals 52 and 53 designate balls and rollers respectively.

Figure 9:
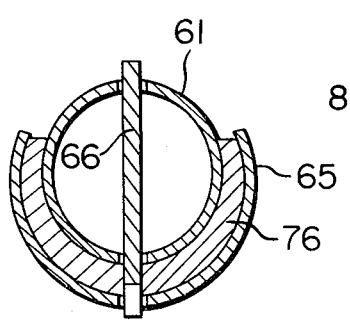
FIG. 9 is a vertical sectional view of part of a fourth embodiment of the present invention.

FIG. 9 shows a fourth embodiment of the present invention in which a slide-rail lower member 65 is concentrically coupled through a slider 76 of high-molecular material to a tubular member 61 which acts as both a side member and a slide-rail upper member. In this embodiment, the slide-rail lower member 65 and the slider 76 serve as bearing means for guiding sliding movement of the tubular member 61. In a modification, a small semi-circular convexity (not shown) may be formed on the upper portion of the tubular member 61, and both of the slider 76 and the slide-rail lower member 65 may be extended to terminate in the vicinity of the shoulders of the convexity. The mechanism for causing movement of a stopper 66 in this fourth embodiment is similar to that shown in FIG. 3 and is mounted at a suitable position.

Figure 10:
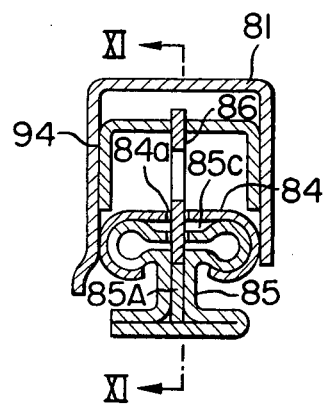
FIG. 10 is a vertical sectional view of part of a fifth embodiment of the present invention, the section being taken along the line X—X in FIG. 11.
Figure 11:
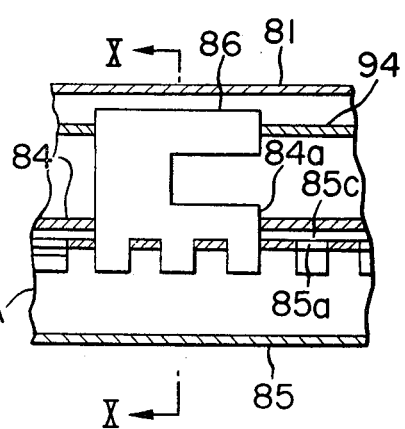
FIG. 11 is a sectional view taken along the line XI—XI in FIG. 10.

FIGS. 10 and 11 show a fifth embodiment of the present invention which is a modification of the structure shown in FIG. 6. Referring to FIGS. 10 and 11, a reinforcing member 94 is secured to the inner surface of a side member 81, and a member 84 corresponding to a slide-rail upper member, of substantially flat oval shape having a bottom opening is securely fixed in the bottom opening of the side member 81. A slide-rail lower member 85 has its upper portion bent into a generally I-like shape conforming to the internal shape of the corresponding member 84 to make sliding movement relative to the member 84. The members 81 and 84 define an internal space of closed section, and a toothed member 84A is securely fixed within the slide-rail lower member 85.

As in the first embodiment, an elongate slot 84a is provided in the top wall of the corresponding member 84, and a stopper 86 is vertically movably disposed. The top surface of the slide-rail lower member 85 is recessed at its central portion to define a space 85c between it and the associated portion of the bottom surface of the corresponding member 84. The space 85c is normally filled with a lubricant such as grease. However, a slider of high-molecular material may be disposed in the space 85c in lieu of the grease, or a gap may be formed between the relative sliding surfaces of the members 84 and 85 and a slider may be interposed therein. Also, these sliders may be integrally combined together. In the embodiment shown in FIGS. 10 and 11, the toothed member 85A (FIG. 10) may be unnecessary when the portion of the member 85 having the slots 85a is mechanically sufficiently strong.

While the balls and rollers are referred to as the rolling members in the aforementioned embodiments, they may be replaced by sliders.

It is apparent also that the mechanism for locking the seat frame to the slide in one of the embodiments is applicable to another when so desired.

Also, while various internal spaces of closed section are illustrated by way of example, the shape of the internal space of closed section is in no way limited to the illustrated ones, and, it is apparent that there are various other shapes.

It will be understood from the foregoing detailed description that the present invention provides a seat frame of integral structure which defines an internal space of closed section adapted to incorporate principal parts of a slide rail mechanism therein. Therefore, the seat frame with an integrally built-in slide rail mechanism according to the present invention is advantageous in that it is compact in construction, light in weight and improved in mechanical strength. Another advantage is that the arrangement of its parts is not subject to limitations owing to the available compartment space unlike the prior art slide rail mechanism subjected to such special limitations.

What is claimed is:

1. A seat frame with an integrally built-in slide-rail mechanism comprising a seat frame structure formed by integrally combining a seat-frame side member and a member corresponding to a slide-rail upper member to define an internal space of closed section therein, a stopper formed as an integral flat plate disposed in said internal space to extend through an elongate slot bored in said seat-frame side member and an aligned elongate slot bored in said slide-rail upper member, said stopper being formed with socket means in a substantially middle portion thereof and being also formed with a plurality of engaging lugs in its bottom portion, actuating means including means extending into said socket means of said stopper for causing vertical movement of said stopper, and a slide-rail lower member disposed beneath said slide-rail upper member to permit sliding movement of said slide-rail upper member relative thereto, said slide-rail lower member being formed of a single integral plate being generally I-shaped in cross-section, both free ends of upper arms of the I-shaped plate being rounded so that the slide-rail upper member snugly engages the free ends without play for sliding movement and with a space being formed between the central area of the upper arms of the I-shaped plate and the slide-rail upper member for receiving a lubricant therein, and said slide-rail lower member being formed with slots in a central portion of said upper arms to receive said engaging lugs of said stopper member, whereby said stopper is moved vertically by said actuating means to move said engaging lugs of said stopper into and from engagement with said slots of said slide-rail lower member to releaseably lock said seat frame in any desired position and to permit longitudinal displacement of said seat frame when desired.

2. A seat frame with an integrally built-in slide rail mechanism as claimed in claim 1, wherein said actuating means includes an actuating lever extending at one end thereof into said socket means of said stopper and crimped at the other end thereof to the inner end of a shaft, and a handle fixedly mounted on the outer end of said shaft, whereby, when said handle is turned to cause vertical movement of said stopper through said lever, said engaging means of said stopper is engaged with or disengaged from said locking slots of said slide-rail lower member.

* * * * *